US011106589B2

(12) United States Patent
Chang

(10) Patent No.: US 11,106,589 B2
(45) Date of Patent: Aug. 31, 2021

(54) CACHE CONTROL IN A PARALLEL PROCESSING SYSTEM

(71) Applicant: X-Drive Technology, Inc., San Jose, CA (US)

(72) Inventor: Darder Chang, San Jose, CA (US)

(73) Assignee: X-Drive Technology, Inc., San Jose, CA (US)

( * ) Notice: Subject to any disclaimer, the term of this patent is extended or adjusted under 35 U.S.C. 154(b) by 0 days.

(21) Appl. No.: 16/453,172

(22) Filed: Jun. 26, 2019

(65) Prior Publication Data

US 2020/0409850 A1 Dec. 31, 2020

(51) Int. Cl.
*G06F 12/0842* (2016.01)
*G06F 12/0815* (2016.01)

(52) U.S. Cl.
CPC .. *G06F 12/0842* (2013.01); *G06F 2212/1016* (2013.01)

(58) Field of Classification Search
CPC .......................... G06F 12/0842; G06F 12/0828
See application file for complete search history.

(56) References Cited

U.S. PATENT DOCUMENTS

| | | | | |
|---|---|---|---|---|
| 5,640,534 A | * | 6/1997 | Liu | G06F 12/0831 711/108 |
| 6,038,647 A | * | 3/2000 | Shimizu | G06F 12/0846 711/129 |
| 2015/0046658 A1 | * | 2/2015 | Wilson | G06F 12/0895 711/135 |

* cited by examiner

*Primary Examiner* — David E Martinez
(74) *Attorney, Agent, or Firm* — Thomas C. Chan; Silicon Valley Patent Group LLP

(57) ABSTRACT

Method and apparatus are disclosed for cache control in a parallel processing system. The apparatus includes a plurality of application specific engines configured to generate a plurality of commands, a cache array configured to store the plurality of commands, and a cache command controller configured to receive a command asynchronously from an application specific engine in the plurality of application specific engines, update the cache array to include the received command, and validate the updated cache array while maintaining parallel accessing of the cache array by the plurality of application specific engines.

24 Claims, 19 Drawing Sheets

| Index | V | Length (32-bits) | LBA (32-bits) |
|---|---|---|---|
| 0 | 1 | Length s | LBA s |
| 1 | 0 | X (don't care) | X (don't care) |
| 2 | 1 | Length t | LBA t |
| ... | 1 | .... | .... |
| N - 1 | 1 | Length w | LBA w |

FIG. 4A

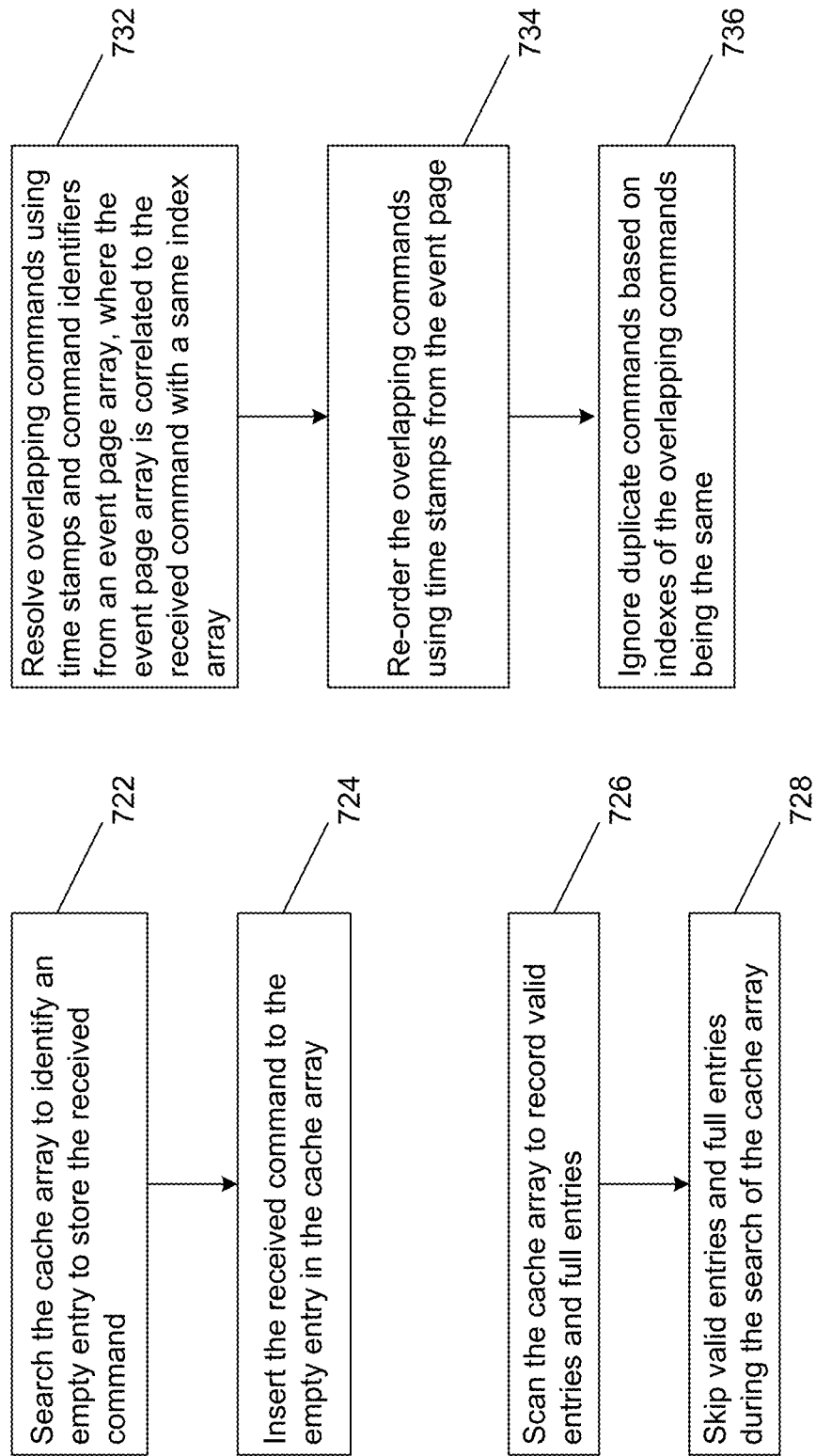

CACHE CONTROL IN A PARALLEL PROCESSING SYSTEM

FIELD OF THE INVENTION

The present invention relates to the field of data access in data center applications. In particular, the present invention relates to cache control in a parallel processing system.

BACKGROUND

FIG. 1A illustrates a conventional implementation of cache control in a system environment. As shown in FIG. 1A, when multiple hardware engines (labeled 102a through 102d), for example multiple CPUs, share a cache array 104 for storing commands, the access of the cache array 104 is managed through an arbitrator 106 to ensure integrity of the cache array and no race condition occurred when two hardware engines try to do searching of the cache array and adding/removing commands in parallel. With this conventional approach, only one hardware engine can be active at a time while the other hardware engines would have to wait. As shown in the example of FIG. 1A, hardware engine 0 (102a) is active, while hardware engines 1 though hardware engine N−1 are inactive.

FIG. 1B illustrates a plot of engine activities versus time in the conventional implementation of FIG. 1A. In this example, to provide an update of command N to the cache array, the system would need to search the cache array to determine the location of command N (labeled by the time 112), and then perform the update of the cache array for command N (labeled by the time 114). Similarly, to provide an update of command N+1 to the cache array, the system would need to search the cache array to determine the location of command N+1 (labeled by the time 116), and then perform the update of the cache array for command N+1 (labeled by the time 118).

There are at least two drawbacks associated with the conventional system shown in FIG. 1A and FIG. 1B. First, during the time when one command is being searched and updated by one hardware engine, no other hardware engine can perform a search and update of the cache array for another command. This can cause a significant performance penalty because the access of the cache array becomes a bottleneck of the system. In addition, the bandwidth of the system bus that accesses the cache array is shared among the multiple hardware engines. In other words, each hardware engine gets a portion of the system bus bandwidth. However, in a parallel processing system, when the number of hardware engines increase, the portion of the system bus bandwidth allocated to each hardware engine would decrease. This decrease in the portion of the system bus bandwidth allocated to each hardware engine can lead to decrease in quality of services provided by the system.

Therefore, there is a need for methods and systems that address the issues of the conventional cache array control scheme described above. Specifically, there is a need for cache control in a parallel processing system.

SUMMARY

Methods and systems are disclosed for cache control in a parallel processing system. In one embodiment, the apparatus includes a plurality of application specific engines configured to generate a plurality of commands, a cache array configured to store the plurality of commands, and a cache command controller configured to receive a command asynchronously from an application specific engine in the plurality of application specific engines, update the cache array to include the received command, and validate the updated cache array while maintaining parallel accessing of the cache array by the plurality of application specific engines.

In another embodiment, a method of cache control in a parallel processing system includes generating, by an application engine in a plurality of application specific engines, a command; receiving, by a cache command controller, the command asynchronously from the application specific engine in the plurality of application specific engines; updating, by the cache command controller, a cache array to include the received command; and validating, by the cache command controller, the updated cache array while maintaining parallel accessing of the cache array by the plurality of application specific engines.

BRIEF DESCRIPTION OF THE DRAWINGS

The aforementioned features and advantages of the invention, as well as additional features and advantages thereof, will be more clearly understandable after reading detailed descriptions of embodiments of the invention in conjunction with the following drawings.

FIG. 4A illustrates an exemplary implementation of a cache array according to aspects of the present disclosure.

FIG. 7C illustrates an exemplary method of updating a cache array to include the received command according to aspects of the present disclosure.

FIG. 7D illustrates an exemplary method of resolving overlapping commands in a cache array according to aspects of the present disclosure.

DESCRIPTION OF EMBODIMENTS

Methods and systems are disclosed for cache control in a parallel processing system. The following descriptions are presented to enable any person skilled in the art to make and use the invention. Descriptions of specific embodiments and applications are provided only as examples. Various modifications and combinations of the examples described herein will be readily apparent to those skilled in the art, and the general principles defined herein may be applied to other examples and applications without departing from the scope of the invention. Thus, the present invention is not intended to be limited to the examples described and shown, but is to be accorded the scope consistent with the principles and features disclosed herein.

Some portions of the detailed description that follows are presented in terms of flowcharts, logic blocks, and other symbolic representations of operations on information that can be performed on a computer system. A procedure, computer-executed step, logic block, process, etc., is here conceived to be a self-consistent sequence of one or more steps or instructions leading to a desired result. The steps are those utilizing physical manipulations of physical quantities. These quantities can take the form of electrical, magnetic, or radio signals capable of being stored, transferred, combined, compared, and otherwise manipulated in a computer system. These signals may be referred to at times as bits, values, elements, symbols, characters, terms, numbers, or the like. Each step may be performed by hardware, software, firmware, or combinations thereof.

Figure 1A:
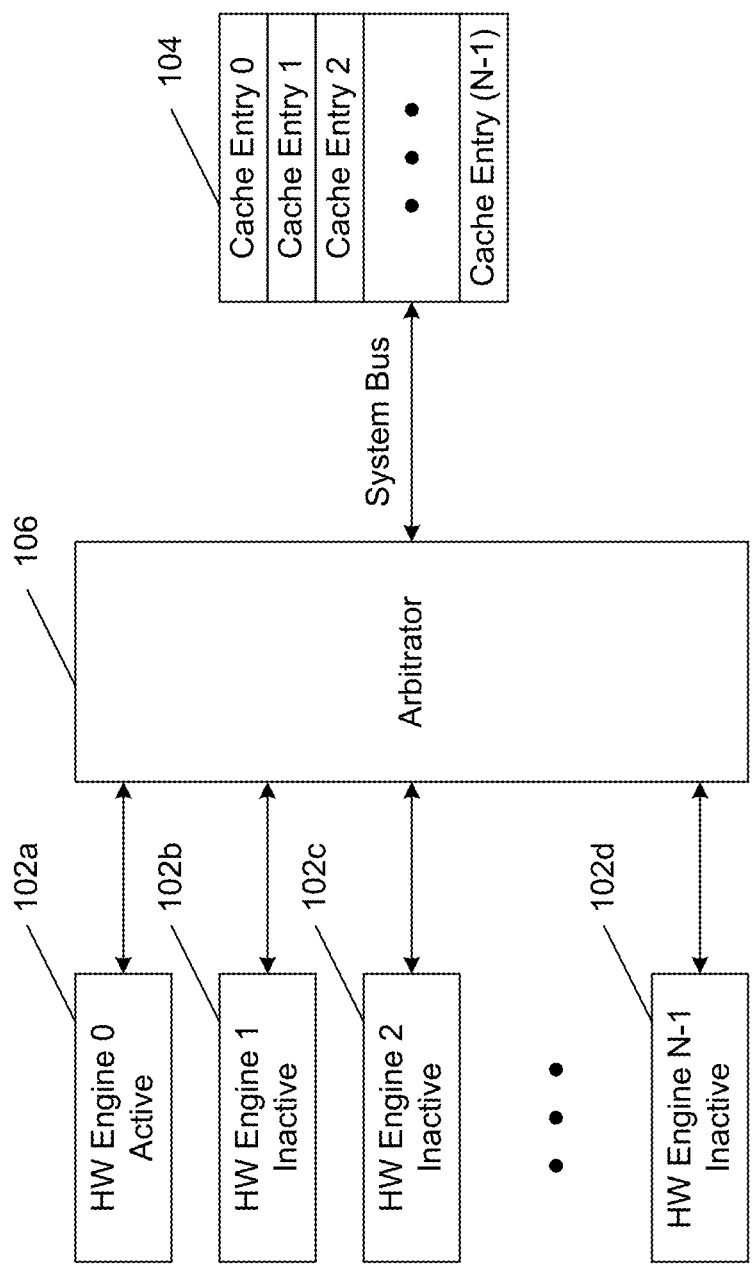
FIG. 1A illustrates a conventional implementation of cache control in a system environment.
Figure 1B:
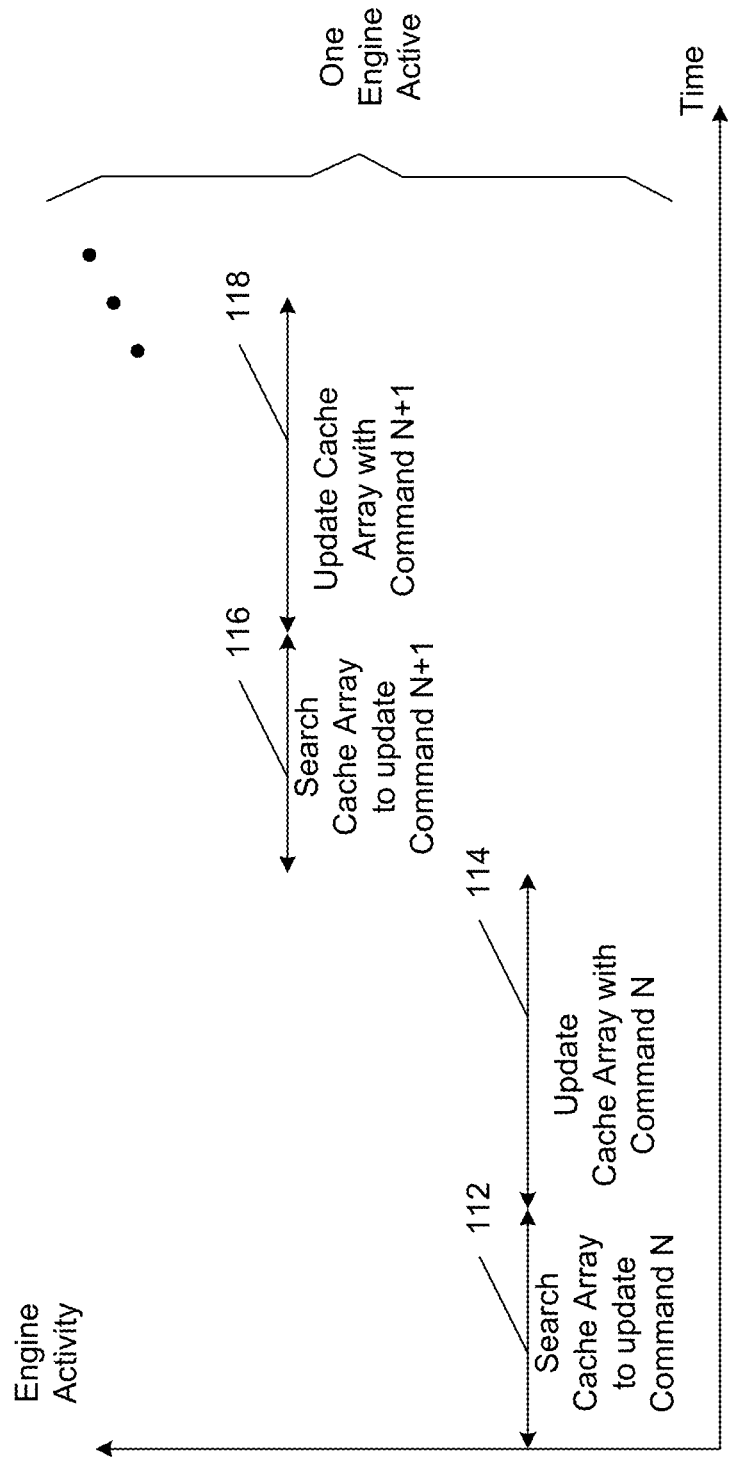
FIG. 1B illustrates a plot of engine activities versus time in the conventional implementation of FIG. 1A.
Figure 2A:
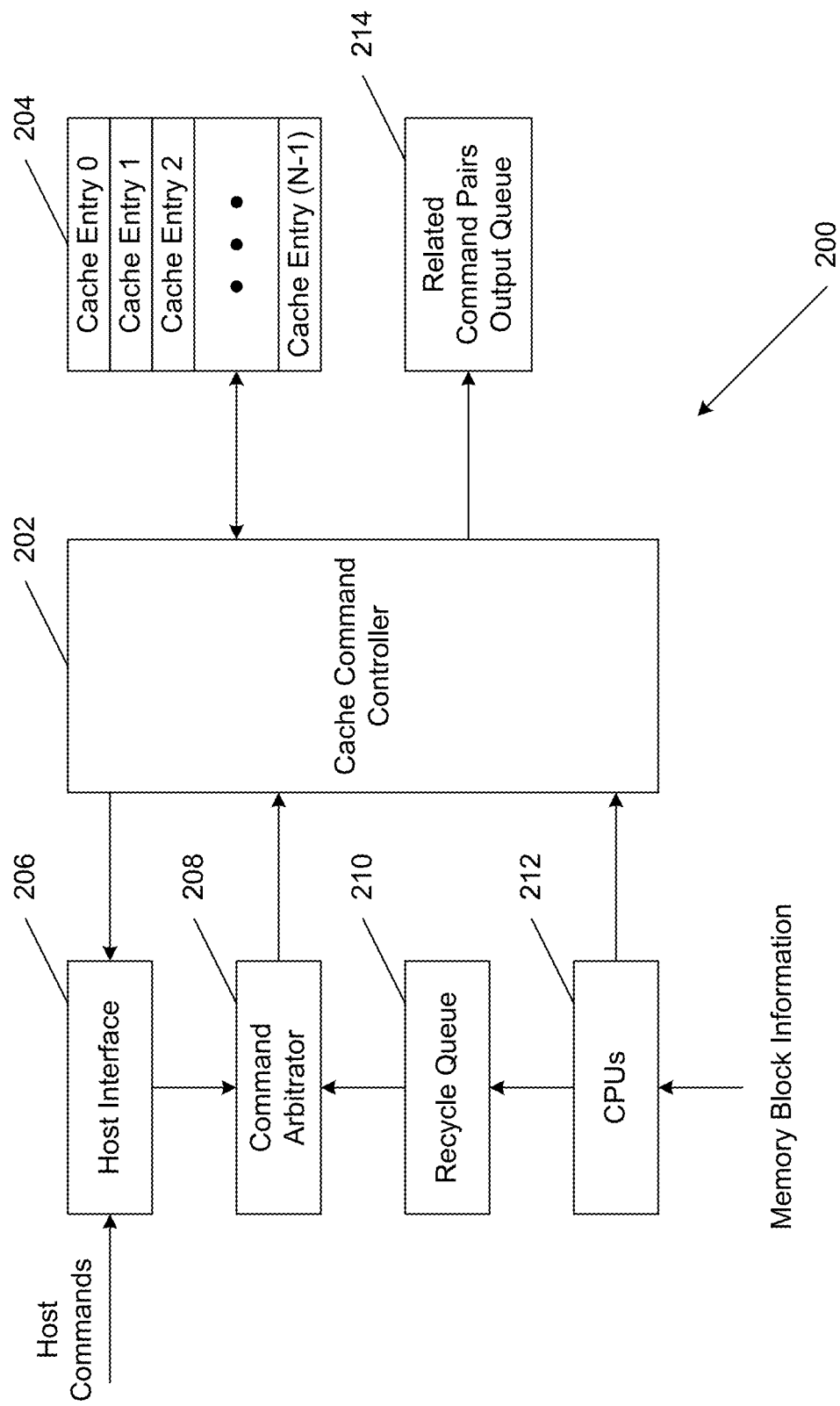
FIG. 2A illustrates an exemplary implementation of a cache control apparatus in a parallel processing system according to aspects of the present disclosure.

FIG. 2A illustrates an exemplary implementation of a cache control apparatus in a parallel processing system according to aspects of the present disclosure. In the exemplary implementation shown in FIG. 2A, a cache control apparatus 200 may include a cache command controller 202, a cache array 204, a host interface 206, a command arbitrator 208, a recycle queue 210, one or more CPUs 212, and a related command pairs output queue 214. In the implementation shown in FIG. 2A, the one or more CPUs may be located outside the cache command controller 202. In some other implementations, the one or more CPUs 212 may be embedded in the cache command controller 202 (not shown). The host interface 206 may be configured to receive one or more host commands, such as commands from various application specific engines. The command arbitrator 208 may be configured to receive commands from the host interface 206 and the recycle queue 210 (also referred to as application specific engines), and provide a selected command to the cache command controller 202. The commands from the host interface 206, the recycle queue 210, or from the one or more CPUs may be collectively considered as a plurality of commands from a plurality of application specific engines.

According to aspects of the present disclosure, the cache command controller 202 may be configured to receive a command asynchronously from an application specific engine in the plurality of application specific engines, update the cache array 204 to include the received command, and validate the updated cache array with the received command while maintaining parallel accessing of the updated cache array 204 by the plurality of application specific engines. In validating the updated cache array 204, the cache command controller may identify related command pairs from the updated cache array 204 and store the related command pairs in the related command pairs output queue 214 for further processing. Entries in the related command pairs output queue 214 may be processed by the cache command controller 202 or by the one or more CPUs 212 during a time period that does not interfere with updating, searching, or processing entries in the cache array 204.

According to aspects of the present disclosure, the one or more CPUs may be configured to monitor solid state drive (SSD) memory block information, determine whether certain NAND block may be recycled, and put such recycle commands in the recycle queue 210. In executing a recycle command, valid data from a NAND block is read, optionally rearranged, and written to a new memory location. Upon completing these procedures, contents of the NAND block may be erased and be prepared for subsequent use. The benefit of performing the recycle commands at the same level as the hot commands is that race conditions during a recycle procedure can be reduced as both the recycle commands and the host commands are arbitrated by the command arbitrator 208.

Figure 2B:
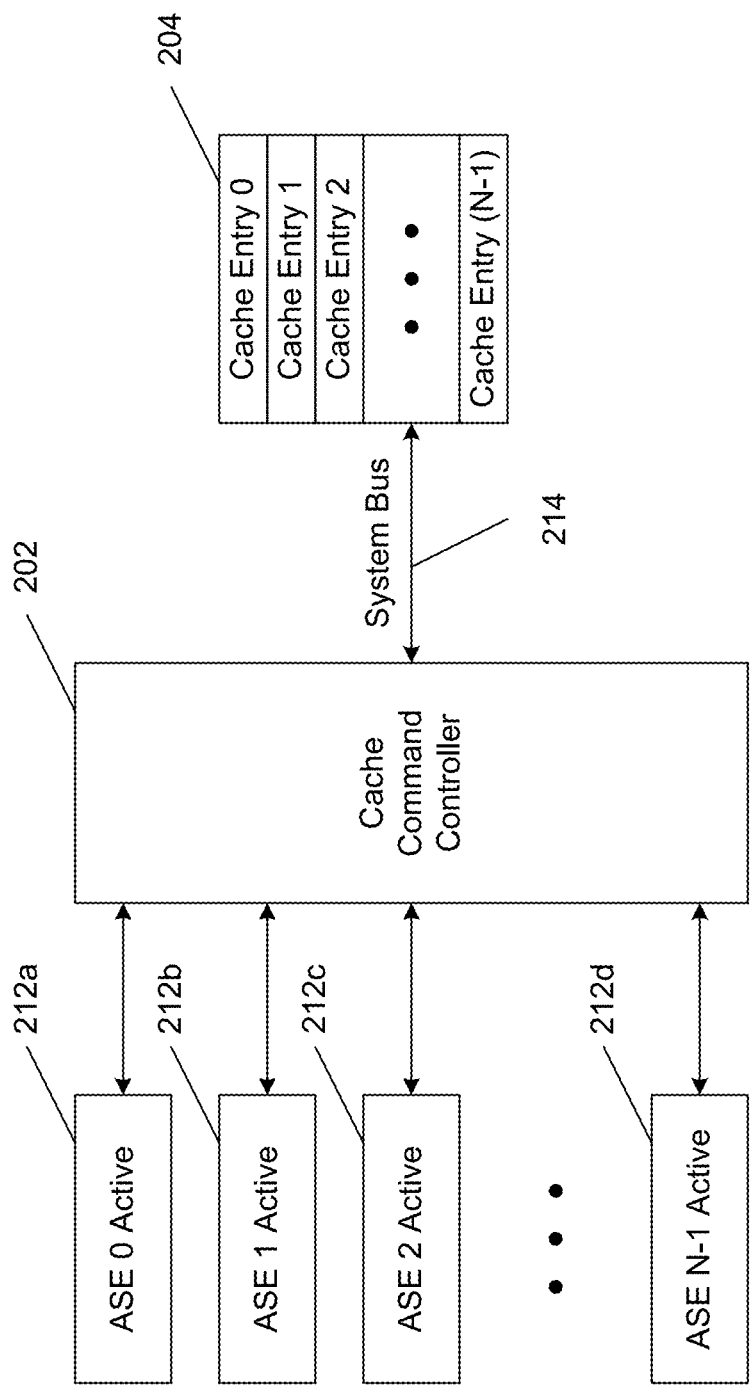
FIG. 2B illustrates engine activities of the cache control apparatus of FIG. 2A according to aspects of the present disclosure.

FIG. 2B illustrates engine activities of the cache control apparatus of FIG. 2A according to aspects of the present disclosure. A simplified cache control apparatus is shown to highlight the performance benefits of the present disclosure. Aspects of the cache command controller described in association with FIG. 2A are not repeated here. Host commands received via the host interface 206 and commands received from the recycle queue 210 of FIG. 2A are represented through a plurality of application specific engines, labelled as 212a, 212b, 212c, and 212d, that execute the host commands and/or recycle commands. The cache array 204 may be configured to store the plurality of commands from the plurality of application specific engines 212a through 212d.

As shown in FIG. 2B, the plurality of application specific engines, ASE0 through ASE N−1 (labelled as 212a through 212d) may be maintained to be active by the cache command controller, in terms of updating, searching, or processing command entries in the cache array 204. The performance of the system bus 214 can be maintained across the plurality of application specific engines by shortening command update time from each of the application specific engine and by supporting a parallel mechanism for searching and processing of the asynchronous command entries from the plurality of application specific engines. In some implementations, when a new application specific engine is added to the plurality of application specific engines, the performance of the system bus bandwidth over the set of application specific engines are not affected as the searching and processing of the asynchronous command entries have been shifted to a non-time critical period.

Figure 2C:
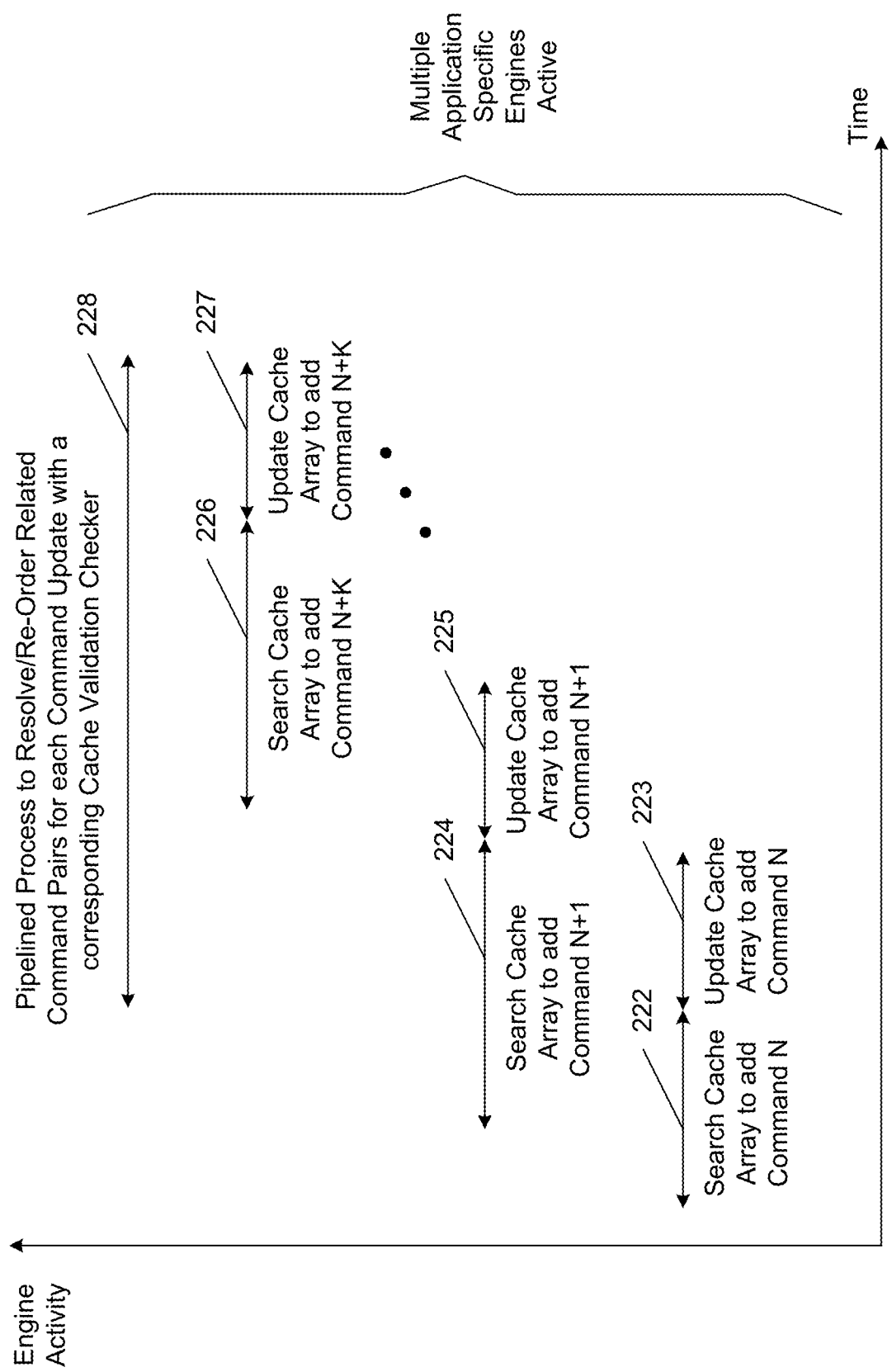
FIG. 2C illustrates a plot of engine activities versus time of the cache control apparatus of FIG. 2A according to aspects of the present disclosure.

FIG. 2C illustrates a plot of engine activities versus time of the cache control apparatus of FIG. 2A according to aspects of the present disclosure. As shown in the example of FIG. 2C, command N from an application specific engine may be entered, i.e. received by the cache command controller 202 asynchronously. To provide an update of command N to the cache array, the time associated with searching the cache array to determine the location of command N is labeled as 222, and the time associated with performing the update of the cache array, in this example to add command N is labeled as 223. At a later time, command N+1 may be received by the cache command controller 202 asynchronously. To provide an update of command N+1 to the cache array, the time associated with searching the cache array to determine the location of command N+1 is labeled as 224, and the time associated with performing the update of the cache array, in this example to add command N+1 is labeled as 225. Thereafter, command N+K may be received by the cache command controller 202 asynchronously. To provide an update of command N+K to the cache array, the time associated with searching the cache array to determine the location of command N+K is labeled as 226, and the time associated with performing the update of the cache array, in this example to add command N+K is labeled as 227.

Note that the times 222, 223, 224, 225, 226, and 227 are not to drawn to scale and they are used for illustration purposes. The actual times may vary and they may depend on the particular system environments the cache array may be in. According to aspects of the present disclosure, while a command is being serviced, a pipelined process can be employed to resolve/re-order related command pairs based on cache validation checks performed for each received command in a background process, labelled as 228. This applies to command N, command N+1, and command N+K in the example of FIG. 2C. Note that the search of the cache array to update an incoming command can be performed in parallel, for example as indicated by times 222 and 224; adding a command to the cache array is performed in a time multiplexed manner as indicated by times 223, 225, and 227. Multiple application specific engines can stay active. Therefore, the overall time associated with searching and updating of new commands can be reduced, because multiple asynchronous commands may be processed by the cache control apparatus in parallel, which in turn improves the performance of the system.

Figure 2D:
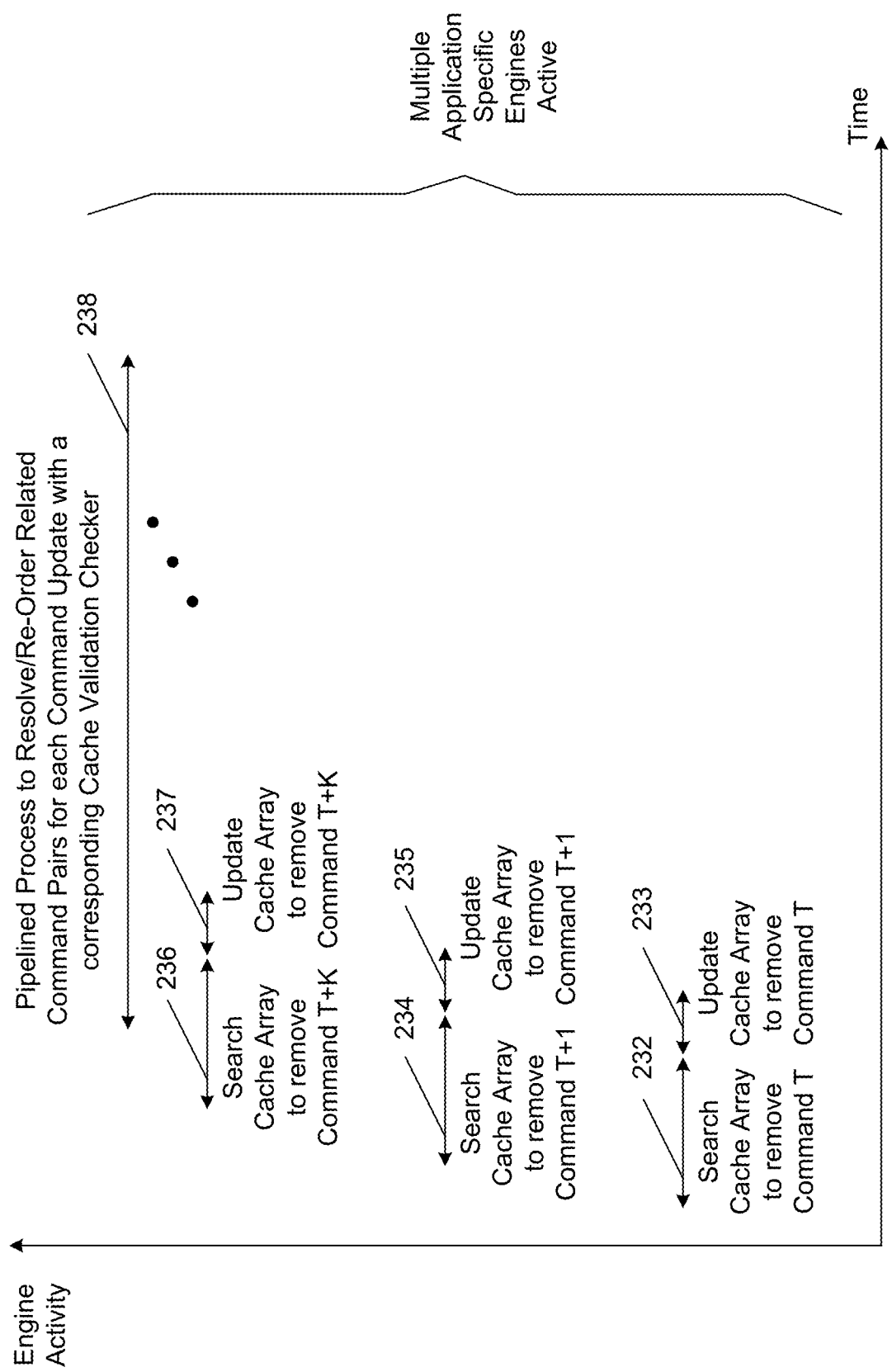
FIG. 2D illustrates another plot of engine activities versus time of the cache control apparatus of FIG. 2A according to aspects of the present disclosure.

FIG. 2D illustrates another plot of engine activities versus time of the cache control apparatus of FIG. 2A according to aspects of the present disclosure. In the example of FIG. 2D, command T from an application specific engine may be entered, i.e. received by the cache command controller 202 asynchronously. To provide an update of command T to the cache array, the time associated with searching the cache array to determine the location of command T is labeled as 232, and the time associated with performing the update of the cache array, in this example to remove command T is labeled as 233. At a later time, command T+1 may be received by the cache command controller 202 asynchronously. To provide an update of command T+1 to the cache array, the time associated with searching the cache array to determine the location of command T+1 is labeled as 234, and the time associated with performing the update of the cache array, in this example to remove command T+1 is labeled as 235. Thereafter, command T+K may be received by the cache command controller 202 asynchronously. To provide an update of command T+K to the cache array, the time associated with searching the cache array to determine the location of command T+K is labeled as 236, and the time associated with performing the update of the cache array, in this example to remove command T+K is labeled as 237.

Note that the times 232, 233, 234, 235, 236, and 237 are not to drawn to scale and they are used for illustration purposes. The actual times may vary and they may depend on the particular system environments the cache array may be in. According to aspects of the present disclosure, while a command is being serviced, a pipelined process can be employed to resolve/re-order related command pairs based on cache validation checks performed for each received command in a background process, labelled as 238. This applies to command T, command T+1, and command T+K in the example of FIG. 2D.

In the example of removing commands from the cache array, the search of the cache array may occur in parallel as indicated by times 232, 234, and 236. In addition, the updating of the cache array may also occur in parallel as indicated by times 233, 235 and 237. The time used to remove a command from the cache array may be achieved by setting a status bit associated with the command, which uses less time than the time used to add a command. For example, time 233 in FIG. 2D (for removing a command from the cache array) is shorter than time 223 in FIG. 2C (for adding a command to the cache array). In this manner, multiple application specific engines can stay active. Therefore, the overall time associated with searching and updating of new commands can be reduced, because multiple asynchronous commands may be processed by the cache control apparatus in parallel, which in turn improves the performance of the system.

Figure 3A:
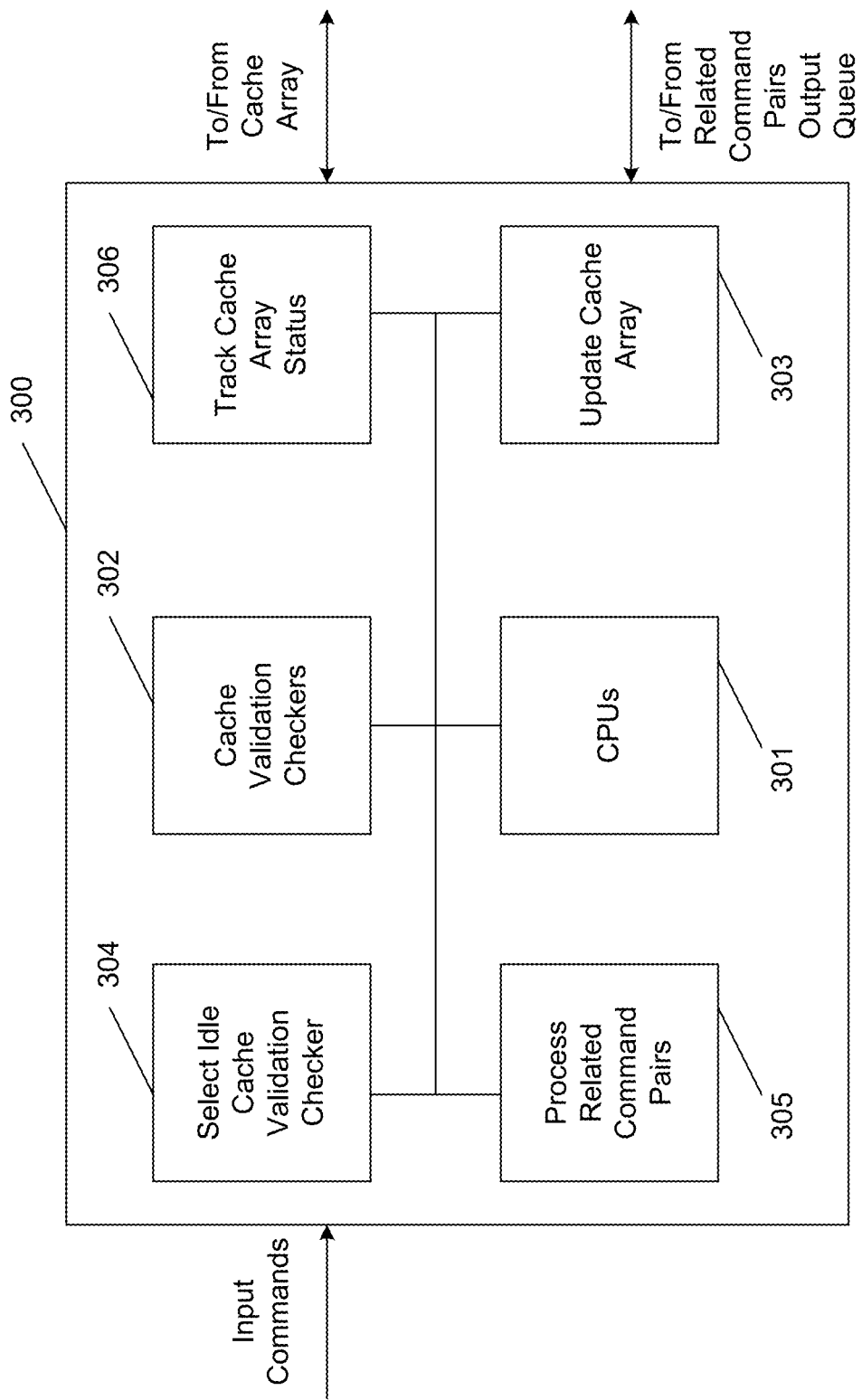
FIG. 3A illustrates an exemplary implementation of a cache command controller according to aspects of the present disclosure.

FIG. 3A illustrates an exemplary implementation of a cache command controller according to aspects of the present disclosure. In the example shown in FIG. 3A, a cache command controller 300 may include one or more CPUs 301, a plurality of cache validation checkers 302, logic configured to update the cache array 303, logic configured to select idle cache validation checker 304, logic configured to process related command pairs 305, and logic configured to track cache array status 306. In some implementations, the one or more CPUs may reside outside of the cache command controller.

According to aspects of the present disclosure, the logic configured to update the cache array 303 may search the cache array to identify an empty entry to store the received command, and insert the received command to the empty entry in the cache array. In response to updating the cache array with the received command, the cache command controller may activate a cache validation checker to validate the received command in the updated cache array. Upon completion of updating the cache array with the received command, the logic configured to update the cache array 303 may set a status bit associated with a cache entry to be valid. Upon completion of executing a command, the logic configured to update the cache array 303 may remove the command from the cache array by setting a status bit associated with a cache entry to be invalid.

The logic configured to select idle cache validation checker 304 may receive an input command from a command arbitrator or from an application specific engine; and select an idle cache validation checker from a plurality of available cache validation checkers 302 to service the input command.

The logic configured to track cache array status 306 may receive information about a cache array, such as cache array 204, process the received information, and provide the processed information to the active cache validation checkers in the plurality of cache validation checkers 302.

A cache validation checker in the plurality of cache validation checker 302 may be configured to loop through entries in the cache array: examine entries of the cache array in a wrapped around manner; detect data range of the received command with respect to commands from the entries of the cache array; identify related command pairs based on the data range of the received command with respect to the commands; and store the related command pairs in an output queue.

The logic configured to process related command pairs 305 may resolve overlapping commands using time stamps and command identifiers from an event page array, where the event page array is correlated to the received command with a same index array, re-order the overlapping commands using time stamps from the event page, and ignore duplicate commands based on indexes of the overlapping commands being the same.

Figures 3B, 3C:
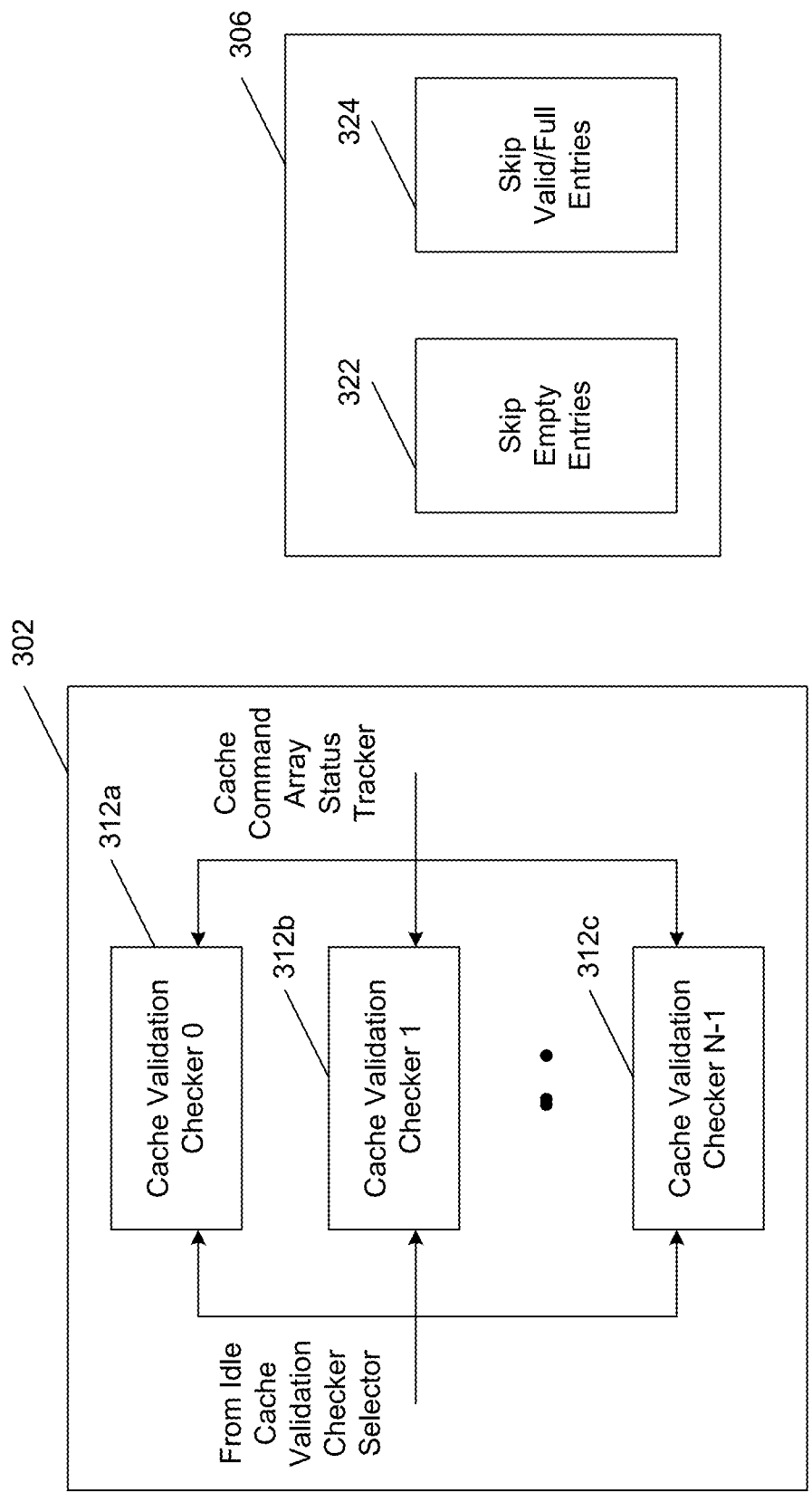
FIG. 3B illustrates an exemplary implementation of cache validation checkers according to aspects of the present disclosure.
FIG. 3C illustrates an exemplary implementation of a cache array status tracker according to aspects of the present disclosure.

FIG. 3B illustrates an exemplary implementation of cache validation checkers according to aspects of the present disclosure. As shown in the exemplary implementation of FIG. 3B, a plurality of cache validation checkers, namely cache validation checker 0 (312a), cache validation checker 1 (312b) through cache validation checker N−1 (312c) may operate in parallel to support a corresponding plurality of asynchronous commands received from a host interface or from a recycle queue. Upon receiving an asynchronous command, one of the idle cache validation checkers can be selected to service the asynchronous command. In servicing the asynchronous commands, the plurality of cache validation checkers uses information provided by a cache array status tracker, such as the cache array status tracker 306.

FIG. 3C illustrates an exemplary implementation of a cache array status tracker according to aspects of the present disclosure. As shown in FIG. 3C, a cache array status tracker 306 may be configured to record information of the cache array and provide a status of the cache array to a plurality of cache validation checkers. For example, the cache array status tracker 306 may provide information on skip valid/full entries in the event when the cache command controller may be seeking for an empty entry in the cache array to insert a received command. The cache array status tracker 306 may also provide information on skip empty entries in the event when the cache command controller may be seeking for a certain command in the cache array.

The logic configured to skip empty entries 322 may scan the cache array to record empty entries, determine a skip count based on a number of empty entries to be skipped, and skip consecutive empty entries by the cache validation checker based on the skip count. The logic configured to skip valid/full entries 324 may include scan the cache array to record valid entries and full entries, and skip valid entries and full entries during the search of the cache array for an empty entry in the cache array to insert a received command.

Figure 3D:
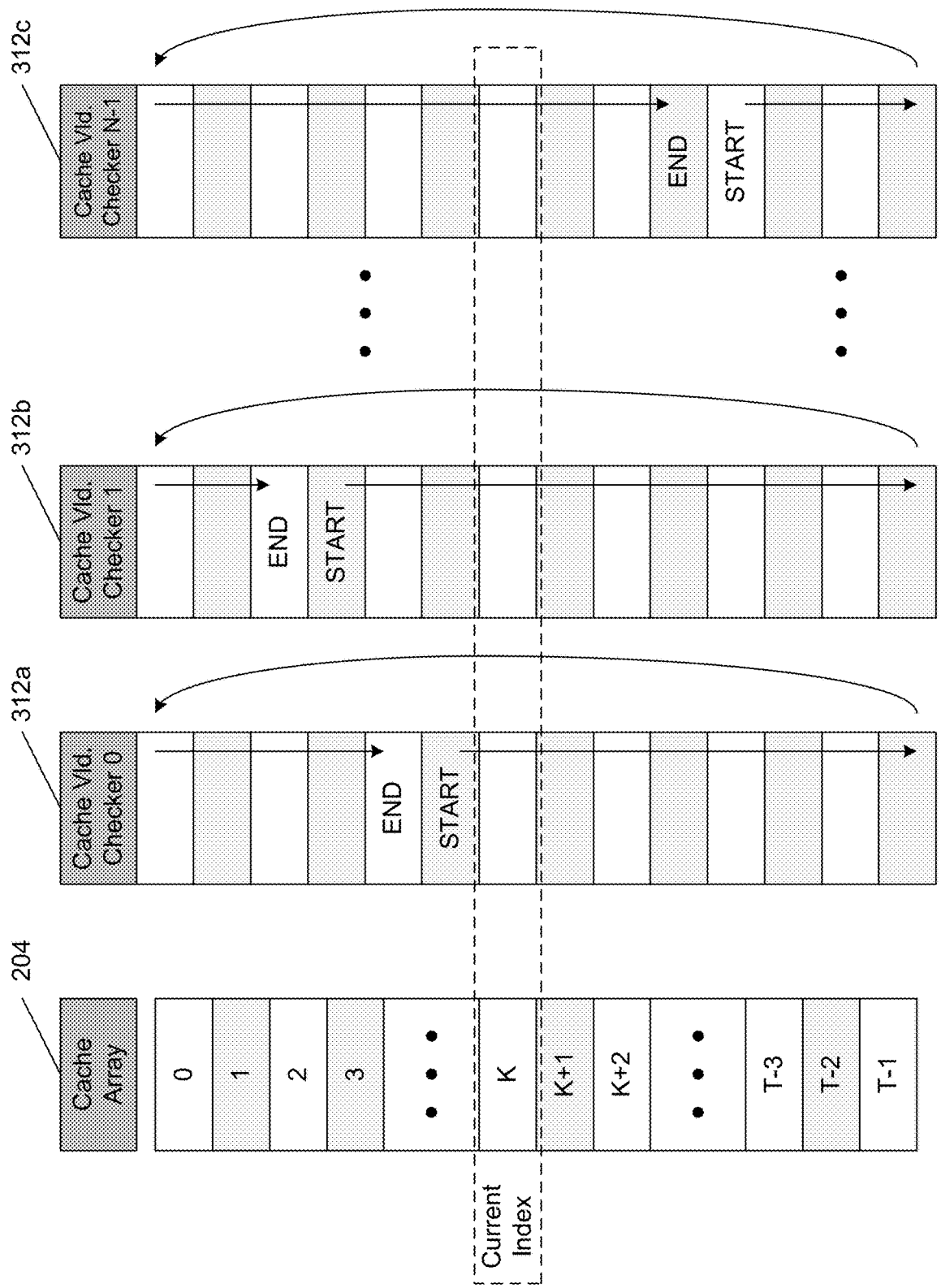
FIG. 3D illustrates an exemplary implementation of maintaining multiple active application specific engines using a plurality of cache validation checkers according to aspects of the present disclosure.

FIG. 3D illustrates an exemplary implementation of maintaining multiple active application specific engines using a plurality of cache validation checkers according to aspects of the present disclosure. In the exemplary implementation shown in FIG. 3D, a plurality of cache validation checkers can be employed to service commands received from their corresponding application specific engines. For example, cache validation check 0 (312a) may be configured to service a first command from a first application specific engine; cache validation check 1 (312b) may be configured to service a second command from a second application specific engine; and cache validation check N−1 (312c) may be configured to service a N−1$^{th}$ command from a N−1$^{th}$ application specific engine. Since the command from each application specific engine may be issued at any random time, i.e. asynchronous with respect to each other, the checking process for each of the cache validation checker may have different START and END entry with respect to the cache array 204. Each of the cache validation checker may examine entries of the cache array in a wrapped around manner; and the checking is completed after the cache validation checker has examined each entry of the cache array after one round through the cache array. Note that the cache validation mechanism of FIG. 3D enables commands from the plurality of application specific engines to be inserted to the cache array in an efficient manner and at the same time enables the plurality of application specific engines to be active in parallel.

Figure 3E:
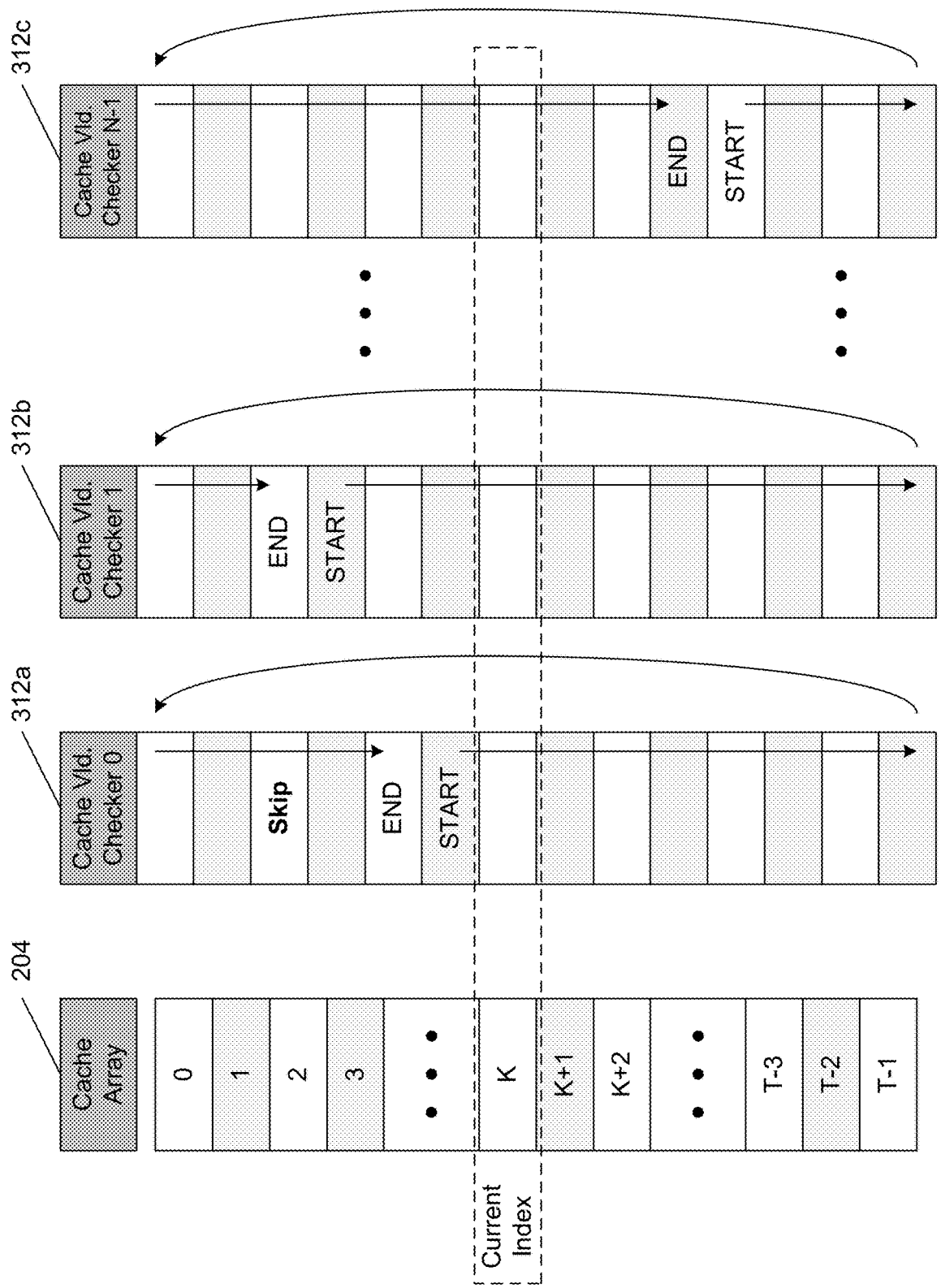
FIG. 3E illustrates another exemplary implementation of maintaining multiple active application specific engines using a plurality of cache validation checkers according to aspects of the present disclosure.

FIG. 3E illustrates another exemplary implementation of maintaining multiple active application specific engines using a plurality of cache validation checkers according to aspects of the present disclosure. As shown in FIG. 3E, certain aspects of the cache validation checkers are similar to that of FIG. 3D, and the descriptions of such aspects are not repeated here. In some implementations, each cache validation checker may be operated at its own pace, and the operation of the cache validation checkers are independent of each other. For example, cache validation checker 0 (312a) may skip one or more cache entries in its checking process, while cache validation checker 1 (312b) and cache validation check N−1 (312c) may not skip any cache entry in their corresponding checking process. In such way, each of the cache validation checker may finish at different time and at different entry of the cache array. Similarly, the cache validation mechanism of FIG. 3E enables commands from the plurality of application specific engines to be inserted to the cache array in an efficient manner and at the same time enables the plurality of application specific engines to be active in parallel.

FIG. 4A illustrates an exemplary implementation of a cache array according to aspects of the present disclosure. As shown in FIG. 4A, a cache array may include an index 402 configured to indicate a location of an entry in the cache array; a validity bit 404 configured to indicate whether the entry is valid; a length field 406 configured to indicate a length of the entry; and a logical block address (LBA) 408 configured to indicate a starting address of the entry. For example, for the first entry, labeled with index 0, this command is marked valid (V=1); it has a length of Length s; and a starting address of LBA s. For the second entry, labeled with index 1, this command is invalid (V=0), which may indicated that the execution of this command has been completed. Thus, the length and LBA of this command are both marked as don't care.

Figure 4B:
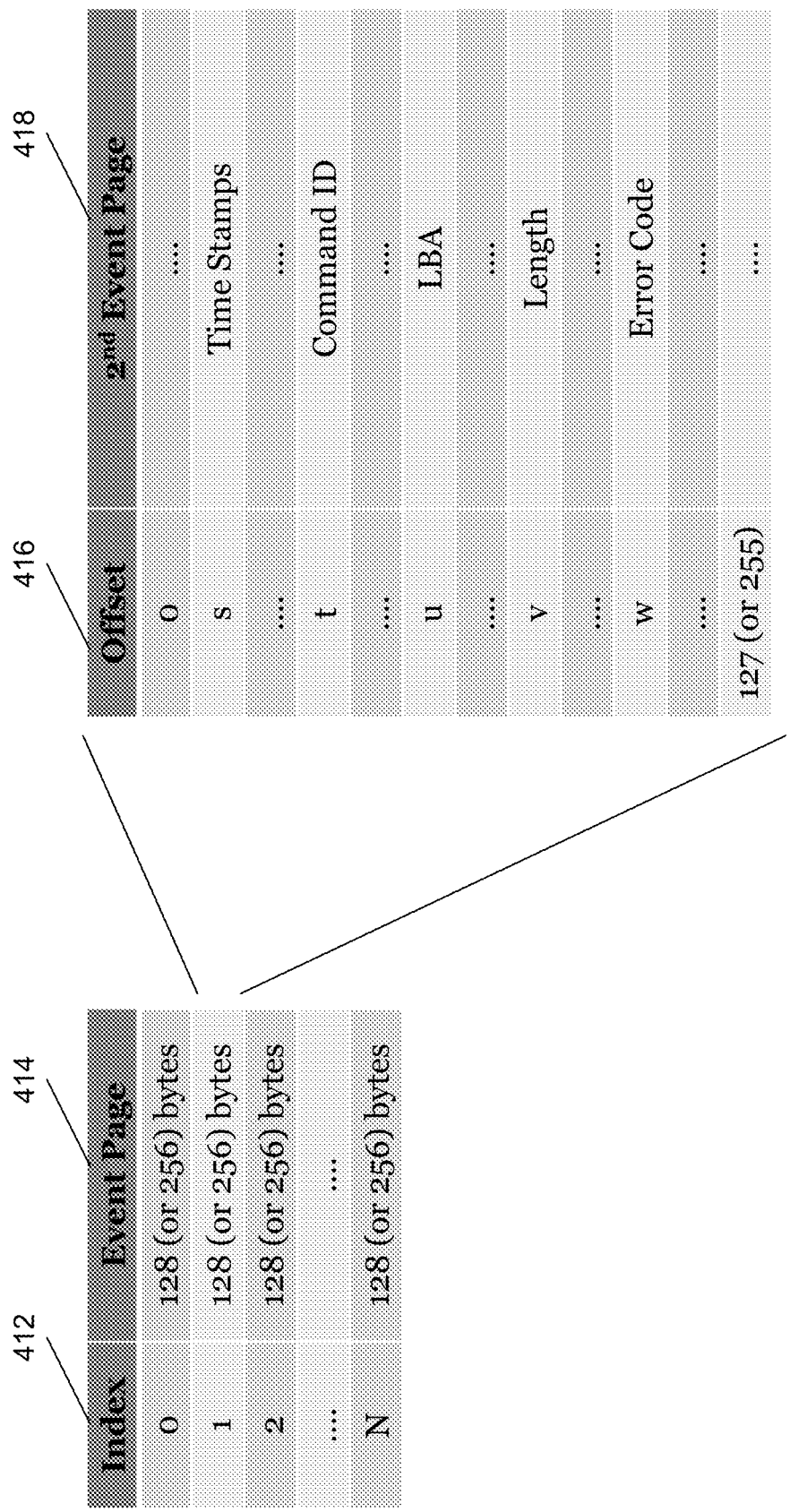
FIG. 4B illustrates an exemplary implementation of an event page array according to aspects of the present disclosure.

FIG. 4B illustrates an exemplary implementation of an event page array according to aspects of the present disclosure. In the example shown in FIG. 4B, an event page may include an index 412 and contents of the event page 414. The contents of an event page may further include an offset field 416 and further information about the event page, labeled as 2$^{nd}$ event page 418. In the 2$^{nd}$ event page 418, information such as time stamps, command ID, LBA, Length, and Error Code may be stored. Such information can be used to resolve the order of overlapping commands stored in the related commands pairs output queue. Note that the index 412 can be kept the same as the index of the cache array, such as cache array 204. In this way, from the index field, a cache command controller can associate an entry in the cache array to an event as it processes asynchronous commands from the host interface or from the recycle queue.

In some implementations, to resolve the order of overlapping commands stored in the related commands pairs output queue, the cache command controller may ignore the condition that ignore INDEX new==INDEX existing from related command pairs output queue. This is because a new command may be added to the cache array before checking; the cache validation checker may go through a round of the cache array and the new command is included; or there is no extra information or cache validation checker to detect itself.

In some implementations, in the process of re-ordering commands, the cache command controller may hit a later inserted command. In such situations, the cache command controller may use Index-pairs to find time stamp in the event page, and ignore the condition that (time stamp new command—time stamp existing command)<0. This is because the existing command may be completed and the same index may be replaced by another new command. The subsequent new command may be added before the cache validation checking process started. As the cache array entries loop around, the method may use the new time minus old time to give the time difference.

In some implementations, to validate an event page, the method may: 1) wait for relevant information being loaded to the event page (for situations when the comparing of new command and existing command finished before data has been loaded); 2) ignore non-cacheable command ID (because this situation is not one of read, write or trim; for example, identify, read buffer, or internal commands); and 3) report or enter error recovery process if error code !=No_Error.

According to aspects of the present disclosure, a cache validation checker can be configured to compare a received command with an existing command in the cache array to identify a related command pair, and store the related command pair in a related command pairs output queue for processing, for example as a background process that does not affect the critical path of the system performance. In processing the related command pairs output queue, the cache command controller may resolve/re-order commands by using time stamps and command IDs in the event page. In addition, other the information in the event page may be used for: 1) using old command no longer exist indicated by a valid flag in the event page; 2) using error code in case the new command has an error; 3) using command ID to determine cacheable command, which include read command, write command, and trim command (delete command), read-to-write command (read new data), write-to-read command (read old data), write-to-write command (abort or trim previous write), and read-to-trim command.

Figure 4C:
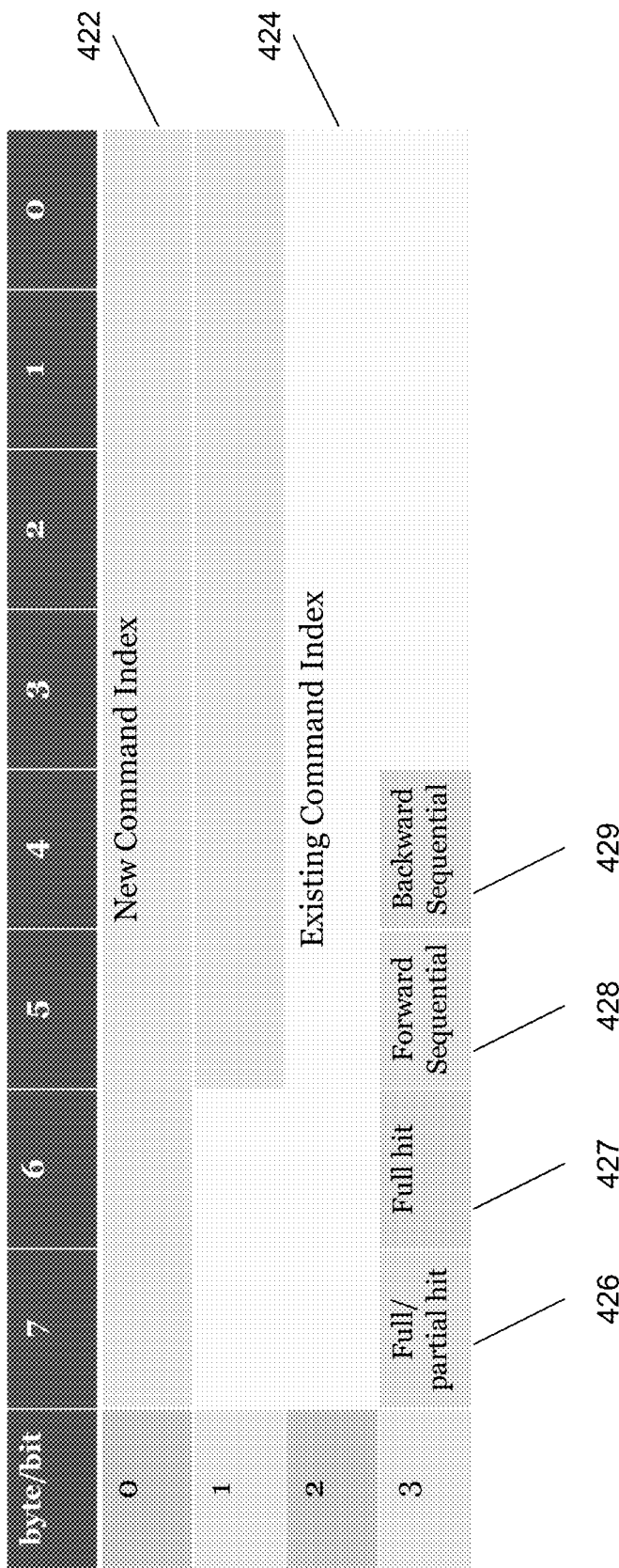
FIG. 4C illustrates an exemplary implementation of an entry in the related command pairs output queue according to aspects of the present disclosure.

FIG. 4C illustrates an exemplary implementation of an entry in the related command pairs output queue according to aspects of the present disclosure. As shown in FIG. 4C, an entry in the related command pairs output queue may include an index of a received (or new) command 422, an index of an existing command 424, and a status of relationships between the received command and the existing command. The status of relationships between the received command and the existing command may include full/partial hit 426, full hit 427, forward sequential 428, and backward sequential 429.

According to aspects of the present disclosure, the status of relationships between the received command and the existing command may be determined as follows. For a partial or full hit, 'or' the following conditions: 1) LBA existing<=LBA new<(LBA existing+Length existing); 2) LBA existing<(LBA new+Length new)<=(LBA existing+Length existing). For a full hit, 'and' the following conditions: 1) LBA existing<=LBA new; 2) (LBA new+Length new)<=(LBA existing+Length existing). The condition for a forward sequential is LBA new==(LBA existing+Length existing). The condition for a backward sequential is LBA existing==(LBA new+Length new).

Figure 4D:
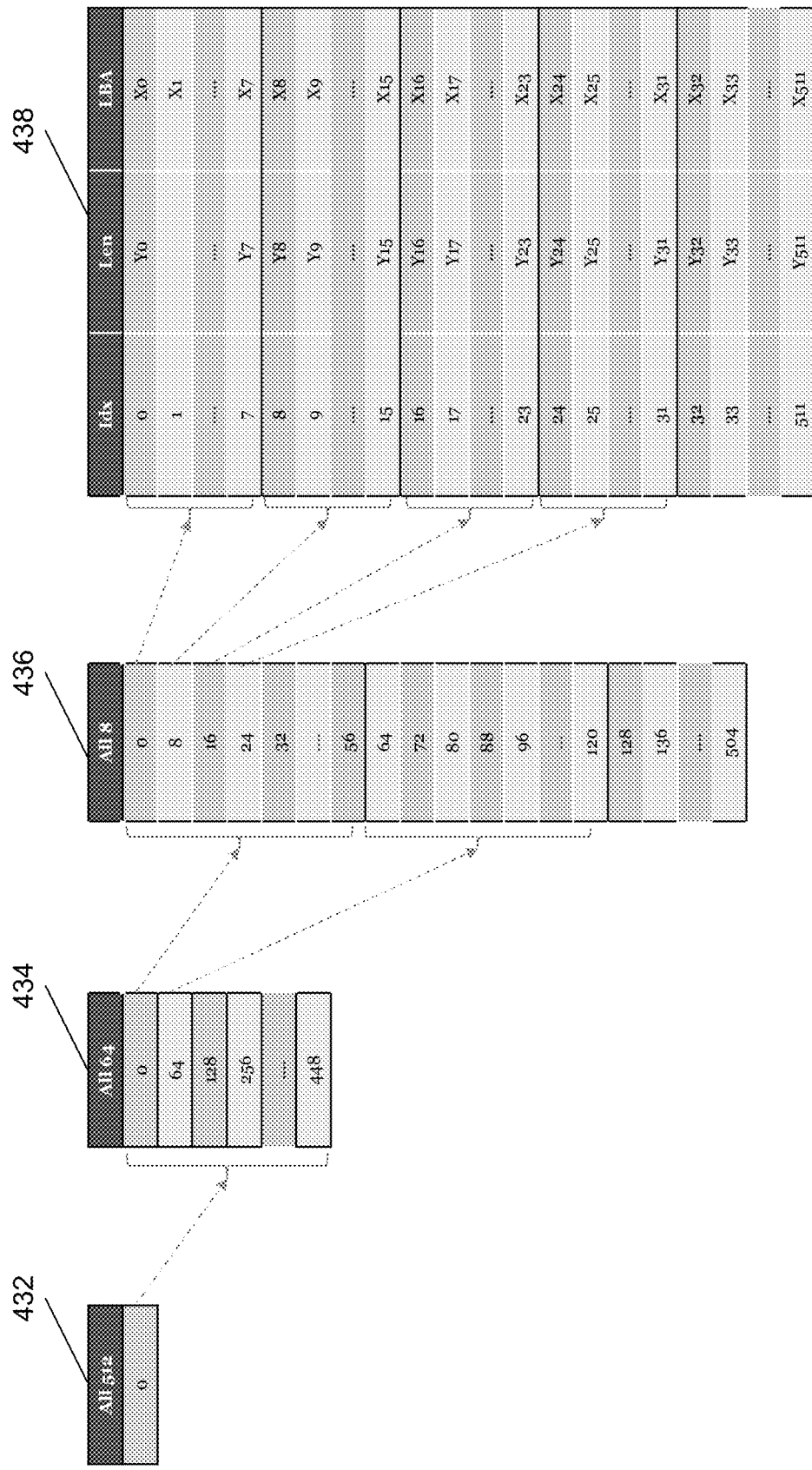
FIG. 4D illustrates an exemplary implementation of tracking a cache array status according to aspects of the present disclosure.

FIG. 4D illustrates an exemplary implementation of tracking a cache array status according to aspects of the present disclosure. The logic configured to track a cache array status may partition the entries in the cache array into multiple small groups, and the status of the multiple smaller groups are tracked in a hierarchical manner. In this particular example, with numeral 438, all entries of a cache array are shown, and the entries are partitioned and examined in groups of 8. With numeral 436, based on the examination of the groups of 8 entries, statuses of each group of 8 entries are recorded. The statuses of the groups of 8 entries may include information about whether the groups of 8 are empty, full, partially full, valid, invalid, etc. With numeral 434, the information about the groups of 8 entries are further consolidated into groups of 64 entries. Similarly, the statuses of the groups of 64 entries may include information about whether the groups of 64 are empty, full, partially full, valid, invalid, etc. With numeral 432, the information about the groups of 64 entries are further consolidated to provide the information about the entire 512 entries.

Note that this status information can be used to accelerate the search for an empty entry to insert a new command, or to accelerate the search for valid commands to determine whether a received command (new) command matches an existing command in the cache array. Therefore, the performance of the system can be improved in such situations. In some implementations, to skip consecutive valid/full entries in the cache array, the method can monitor the following conditions: 1) condition for sub-group full: 'AND' 8 "valid" bits==1; 2) condition for group full: 'AND' 8 Sub-groups==1; and 3) condition for the cache array full: 'AND' 8 Groups==1. To skip consecutive empty entries, the method can monitor the following conditions: 1) condition for sub-group empty: 'OR' 8 "valid" bits==0; 2) condition for group empty: 'OR' 8 Sub-groups==0; 3) condition for the cache array empty: 'OR' 8 Groups==0.

In some implementations, a pseudo code for search for a next empty entry may include:

```
Increment "Current Index" by 1, wrap around to 0 if over
    array size
Loop
    if the entire Cache Array is full
        "Current Index"=0xFFFF
        halt, will be resumed if any removing completed
    else if entire Cache Array is empty
        "Current Index"=0
        Found and exit
    else if "Current Index" is on the Group boundary (xxx
        000 000 b) 'AND' the whole "Group" is full
        Increment "Current Index" by 001 000 000b, wrap
            around to 0 if over array size
    else if "Current Index" is on the Sub-group boundary
        (xxx xxx 000 b) 'AND' the whole "Sub-group" is
        full
        Increment "Current Index" by 000 001 000b, wrap
            around to 0 if over array size
    else if the "valid" bit pointed by "Current Index" is set
```

Figure 5:
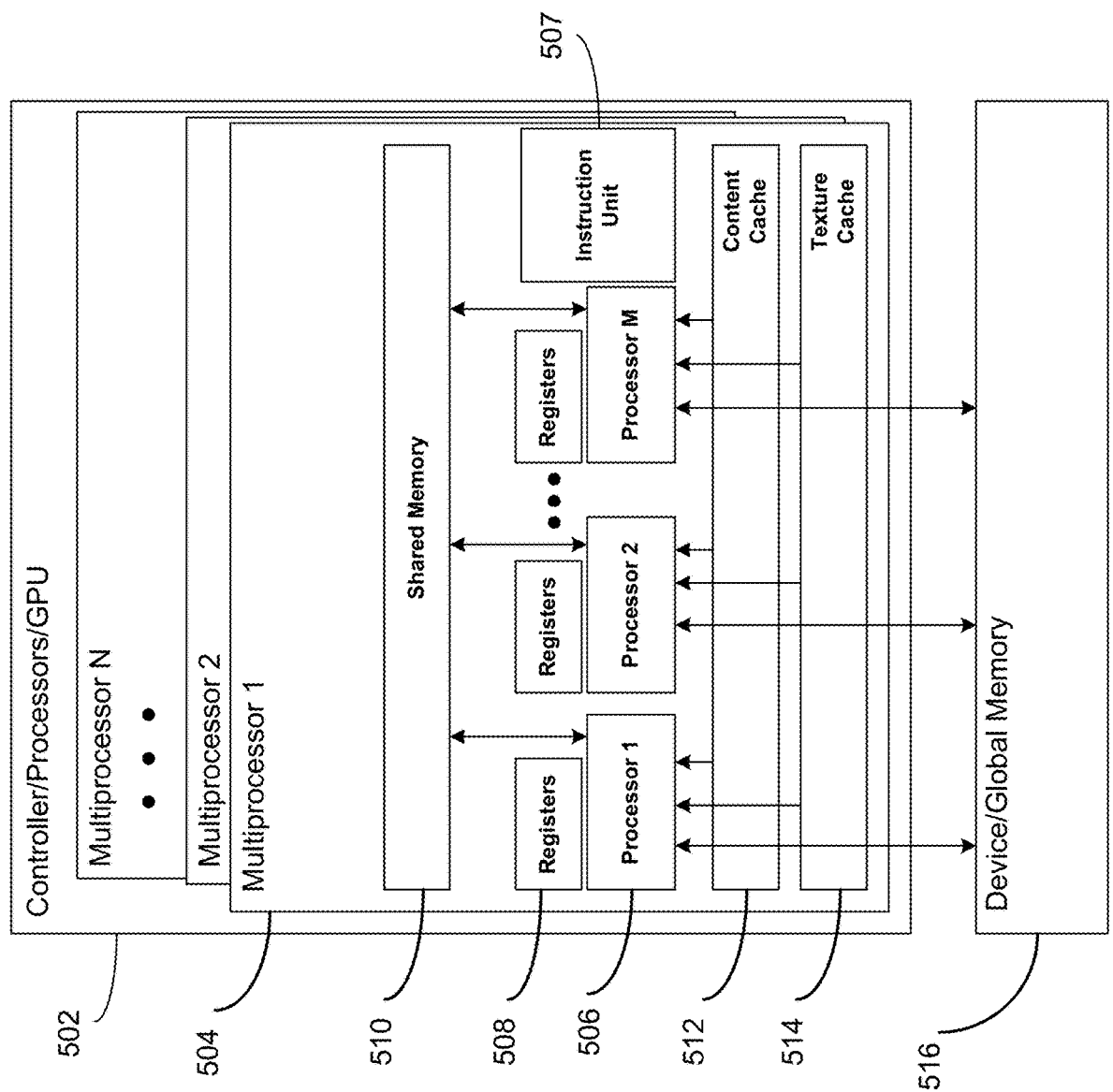
FIG. 5 illustrates an exemplary implementation of one or more CPUs to work with a cache command controller of the cache control apparatus according to aspects of the present disclosure.

Increment "Current Index" by 000 000 001b, wrap
around to 0 if over array size
else
Found and exit
In some implementations, a pseudo code for searching a next valid entry for a hit condition may include:
Increment "Current Index" by 1, wrap around to 0 if over array size
Each Cache-Checking Engine shall clear its internal counters
hit commands
processed entries including skipped entries
Loop if processed entries <number of array entries
if no Engine is running
Halt, will be resumed if any New Command received
else if entire Cache Array is empty
Never happen because the array contains at least one command—the New Command itself
else if "Current Index" is on the Group boundary (xxx 000 000 b) 'AND' the whole "Group" is empty
Increment "Current Index" by 001 000 000b, wrap around to 0 if over array size
processed entries+=001 000 000b
else if "Current Index" is on the Sub-group boundary (xxx xxx 000 b) 'AND' the whole "Sub-group" is empty
Increment "Current Index" by 000 001 000b, wrap around to 0 if over array size
processed entries+=000 001 000b
else if the "valid" bit pointed by "Current Index" is cleared
Increment "Current Index" by 000 000 001b, wrap around to 0 if over array size
processed entries+=000 000 001b
else
Check hit
Increment hit commands by 1 if hit
Push index-pairs to Output Queue if hit
if hit commands==0
Never happen
else if hit commands==1
INDEX existing=0xFFFF
Push index-pairs to Output Queue According to aspects of the present disclosure, one or more central processing units (CPUs) or graphic processing units (GPUs) may be configured to control the cache control apparatus in a parallel processing system. FIG. 5 illustrates an exemplary implementation of one or more CPUs to work with a cache command controller of the cache control apparatus according to aspects of the present disclosure. As shown in FIG. 5, each controller 502 includes N multiprocessors. Each multiprocessor 504 further includes M processors 506 and an instruction unit 507. Each processor has its own registers 508. All the processors 506 in one multiprocessor 504 share a block of shared memory 510. All the processors share the same set of constant cache 512 and texture cache 514 memories. They can also access the data in device memory 516, which is also referred to as the global memory.

In this example, each multiprocessor 504 has a block of shared memory. Accessing data from the shared memory 510 is much faster than accessing data from the device (global) memory 516. For this reason, one approach to increase computational efficiency is to load the data from the global memory 516 to the shared memory 510, perform much of the computations/manipulations using the shared memory 510, and then write back the results from the shared memory 510 to the global memory 516.

Controller 502 may include a plurality of multiprocessors, such as multiprocessor 1 through multiprocessor N. In this example, each of processor may be configured to execute tasks. The tasks may be of different types, and, in some examples, each respective type of task may be stored in or associated with a respective task queue while waiting for execution by a processor. The different types of tasks may include, for example, front end tasks, which may include receiving and interpreting instructions received from host device 4. Other types of tasks including caching; back-end tasks, which may include reading data from or writing data to NVM 10; housing-keeping, which may include garbage collection, wear leveling, TRIM, or the like; and system tasks. In some examples, each processor may be referred to as a compute unit, a processing unit, a core, or a central processing unit (CPU).

In accordance with examples of this disclosure, a first processor 506 may be configured to operate as a scheduler that schedules tasks for execution by at least one other processor. First processor 506 may assign tasks from a plurality of task queues to at least one other processor. As described above, each of the task queues may be associated with a task type.

In contrast to some other scheduling techniques, each task queue is associated with a respective priority ratio, and the priority ratio defines the frequency with which tasks from the respective task queue are scheduled by first processor 506 to be executed by the at least one processor. The respective priority ratio for each task queue may be based at least in part on the number of tasks in the respective task queue. In this way, the respective priority ratios are reflective of a number of tasks in the respective task queues, and the frequency with which tasks from a task queue are assigned by first processor 506 for execution is based at least in part on the number of tasks in the task queue.

In some examples, the respective priority ratios may be updated from time to time, such that the respective priority ratios are reflective of a current or recent number of tasks in the respective task queues. In this way, the techniques described herein may facilitate auto prioritization of the respective task queues based at least in part on the number of tasks currently or recently in the task queue.

For example, first processor 506 may determine the respective priority ratio associated with each task queue based at least in part on a number of tasks in the respective task queue. In some examples, first processor 506 additionally may base the priority ratio on a type of task associated with the respective task queue. For example, front-end tasks may have a higher priority than house-keeping tasks or system tasks. The priority ratio may define a relative frequency with which first processor 506 assigns task from the respective task queues to the at least one other processor. First processor 506 may update the respective priority ratio from time to time to adjust for the number of tasks in the respective task queue.

In some examples, first processor 506 may assign tasks from the respective task queues to the at least one other processor by progressing through tasks associated with the respective task queues in a predetermined order in which the task queues are interleaved. First processor 506 may determine whether to send a task from a respective task queue to be executed by at least one other processor based on the priority ratio of the respective task queue, which may be a ratio of execute indicators to skip indicators. In this way, when the priority ratio associated with a respective task queue is higher, first processor 506 assigns tasks from the respective task queue to the at least one other processor more often than when the priority ratio associated with the respective task queue is lower. Further, assuming the priority ratio is greater than zero, first processor 506 continues to assign tasks from each respective task queue to the at least one other processor.

Figure 6:
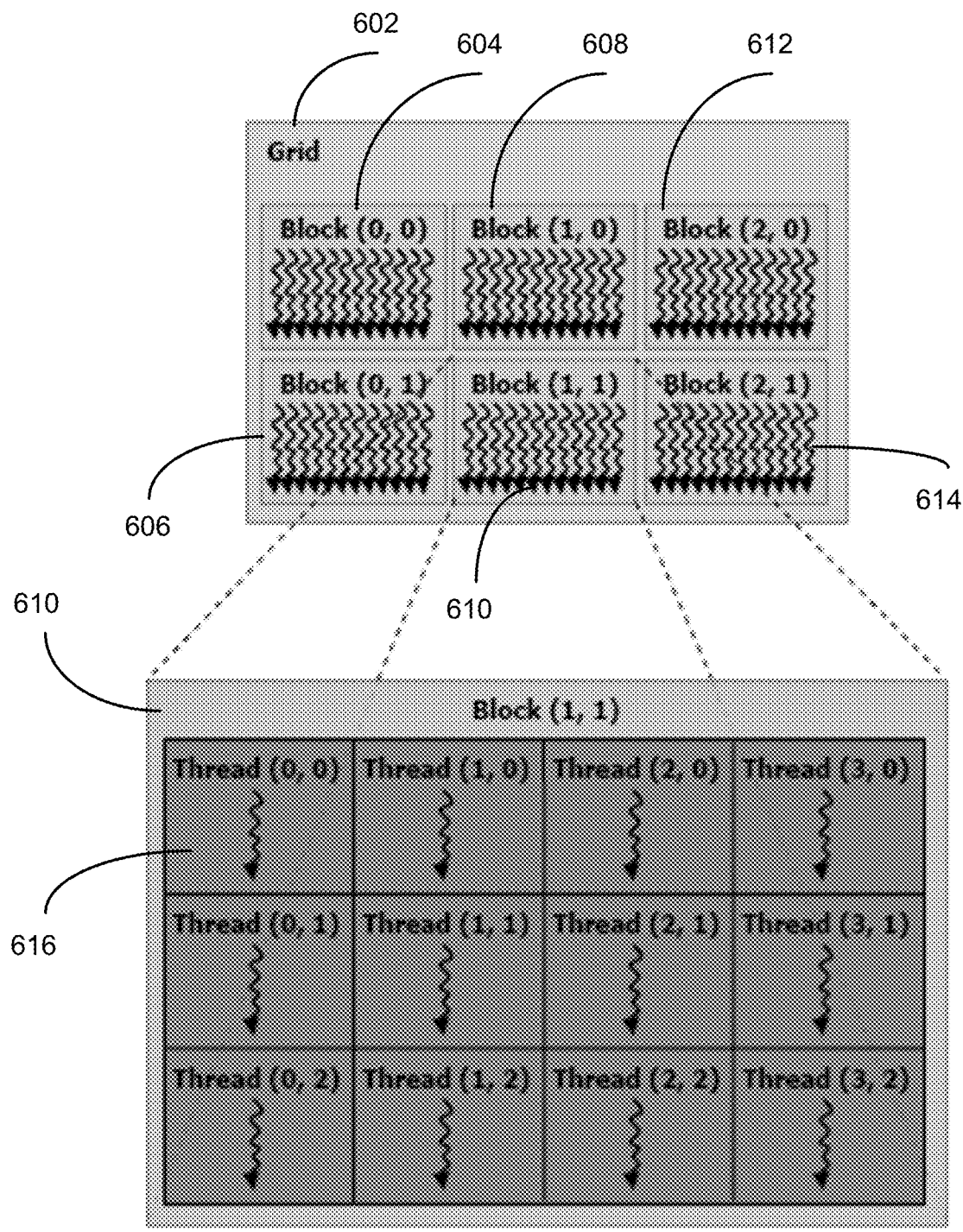
FIG. 6 illustrates an exemplary arrangement of threads in a programmable state machine controller according to aspects of the present disclosure.

FIG. 6 illustrates an exemplary arrangement of threads in a programmable state machine controller according to aspects of the present disclosure. In this example, threads are arranged in a grid 602, and they are divided into blocks of threads, for example block (0,0) 604, block (0,1) 606, block (1,0) 608, block (1,1) 610, block (2,0) 612, and block (2,2) 614. Each block of threads (for example block (1,1) 610, is assigned to one multiprocessor and threads within one block, for example thread (0,0) 616, can communicate with each other using the shared memory as described in association with FIG. 5.

Figures 7A, 7B:
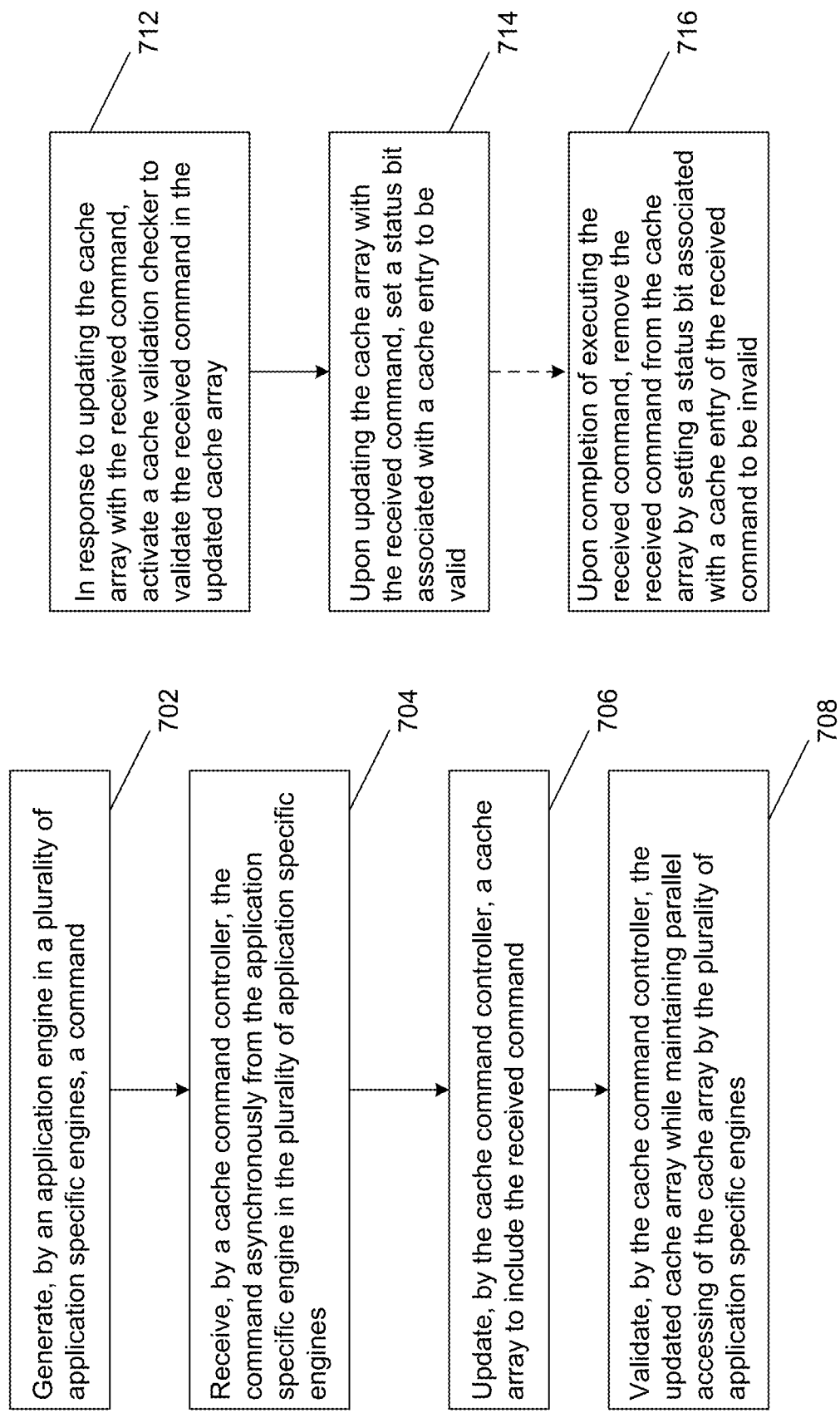
FIG. 7A illustrates a method of cache control in a parallel processing system according to aspects of the present disclosure.
FIG. 7B illustrates an exemplary method of updating a cache array according to aspects of the present disclosure.

FIG. 7A illustrates a method of cache control in a parallel processing system according to aspects of the present disclosure. In the example shown in FIG. 7A, in block 702, the method generates, by an application engine in a plurality of application specific engines, a command. In block 704, the method receives, by a cache command controller, the command asynchronously from the application specific engine in the plurality of application specific engines. In block 706, the method updates, by the cache command controller, a cache array to include the received command. In block 708, the method validates, by the cache command controller, the updated cache array while maintaining parallel accessing of the cache array by the plurality of application specific engines.

According to aspects of the present disclosure, the plurality of commands may include at least one of: one or more host commands received via a host interface; or one or more recycle commands, retrieved from a recycle queue, configured to identify a NAND block of a solid-state drive for recycle. A command in the plurality of commands may include a command header descriptor, and where the command header descriptor may include: an index configured to indicate a location of the entry in the cache array; a validity bit configured to indicate whether the entry is valid; a length field configured to indicate a length of the entry; and a logical block address configured to indicate a starting address of the entry.

FIG. 7B illustrates an exemplary method of updating a cache array according to aspects of the present disclosure. As shown in FIG. 7B, in block 712, in response to updating the cache array with the received command, the method activates a cache validation checker to validate the received command in the updated cache array. In block 714, upon updating the cache array with the received command, the method sets a status bit associated with a cache entry to be valid. In some implementations, the methods performed in block 712 and block 714 may further include the methods performed in block 716. In block 716, upon completion of executing the received command, the method removes the received command from the cache array by setting a status bit associated with a cache entry of the received command to be invalid.

FIG. 7C illustrates an exemplary method of updating a cache array to include the received command according to aspects of the present disclosure. In the example shown in FIG. 7C, in block 722, the method searches the cache array to identify an empty entry to store the received command. In block 724, the method inserts the received command to the empty entry in the cache array. In some implementations, the methods performed in block 722 may further include the methods performed in block 726 and block 728. In block 726, the method scans the cache array to record valid entries and full entries. In block 728, the method skips valid entries and full entries during the search of the cache array.

FIG. 7D illustrates an exemplary method of resolving overlapping commands in a cache array according to aspects of the present disclosure. In the exemplary method of FIG. 7D, in block 732, the method resolves overlapping commands using time stamps and command identifiers from an event page array, where the event page array is correlated to the received command with a same index array. In block 734, the method re-orders the overlapping commands using time stamps from the event page. In block 736, the method ignores duplicate commands based on indexes of the overlapping commands being the same.

Figure 7E:
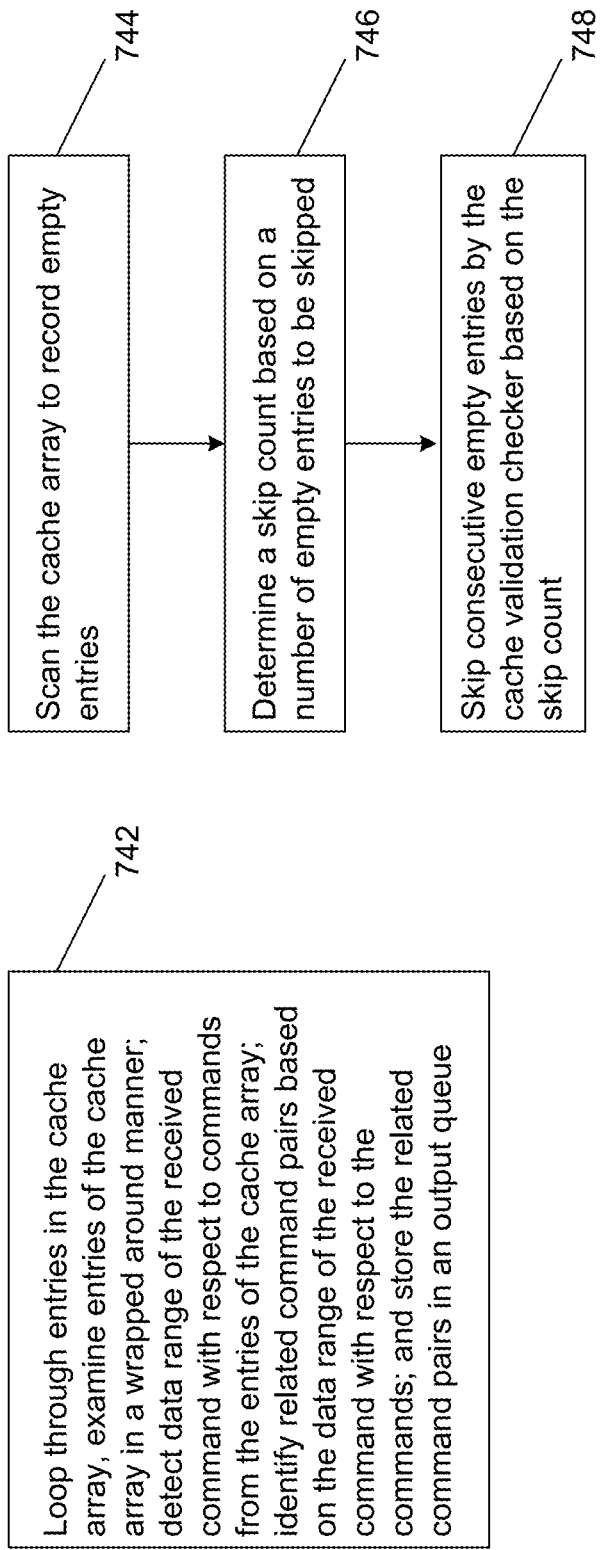
FIG. 7E illustrates an exemplary method of validating a cache array according to aspects of the present disclosure.

FIG. 7E illustrates an exemplary method of validating a cache array according to aspects of the present disclosure. In the exemplary method of FIG. 7E, in block 742, the method loops through entries in the cache array: examines entries of the cache array in a wrapped around manner; detects data range of the received command with respect to commands from the entries of the cache array; identifies related command pairs based on the data range of the received command with respect to the commands; and stores the related command pairs in an output queue. In some implementations, the methods performed in block 742 may further include the methods performed in block 744, block 746 and block 748. In block 744, the method scans the cache array to record empty entries. In block 746, the method determines a skip count based on a number of empty entries to be skipped. In block 748, the method skips consecutive empty entries by the cache validation checker based on the skip count.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processors or controllers. Hence, references to specific functional units are to be seen as references to suitable means for providing the described functionality rather than indicative of a strict logical or physical structure or organization.

The invention can be implemented in any suitable form, including hardware, software, and firmware, or any combination of these. The invention may optionally be implemented partly as computer software running on one or more data processors and/or digital signal processors. The elements and components of an embodiment of the invention may be physically, functionally, and logically implemented in any suitable way. Indeed, the functionality may be implemented in a single unit, in a plurality of units, or as part of other functional units. As such, the invention may be implemented in a single unit or may be physically and functionally distributed between different units and processors.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

The terms, "and," and "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the invention to the precise forms disclosed. Many modifications and variations are possible in view of the above teachings. The embodiments were chosen and described to explain the principles of the invention and their practical applications, and to enable others skilled in the art to best utilize the invention and various embodiments with various modifications as suited to the particular use contemplated.

What is claimed is:

1. An apparatus for controlling cache commands in a parallel processing system, comprising:
    a plurality of application specific engines configured to generate a plurality of commands;
    a cache array configured to store the plurality of commands; and
    a cache command controller configured to
    receive a command asynchronously from an application specific engine in the plurality of application specific engines,
    update the cache array to include the received command, and
    validate the updated cache array while maintaining parallel accessing of the cache array by the plurality of application specific engines.

2. The apparatus of claim 1, wherein a command in the plurality of commands includes a command header descriptor, and wherein the command header descriptor comprises:
    an index configured to indicate a location of the entry in the cache array;
    a validity bit configured to indicate whether the entry is valid;
    a length field configured to indicate a length of the entry; and
    a logical block address configured to indicate a starting address of the entry.

3. The apparatus of claim 1, further comprising:
    a command arbitrator configured to select the received command from the plurality of application specific engines for processing.

4. The apparatus of claim 1, wherein the plurality of commands comprises at least one of:
    one or more host commands received via a host interface; or
    one or more recycle commands, retrieved from a recycle queue, configured to identify a NAND block of a solid-state drive for recycle.

5. The apparatus of claim 1, wherein the cache command controller is further configured to:
    search the cache array to identify an empty entry to store the received command; and
    insert the received command to the empty entry in the cache array.

6. The apparatus of claim 5, wherein the cache command controller is further configured to:
    scan the cache array to record valid entries and full entries; and
    skip valid entries and full entries during the search of the cache array.

7. The apparatus of claim 1, wherein the cache command controller is further configured to:
    in response to updating the cache array with the received command, activate a cache validation checker to validate the received command in the updated cache array; and upon updating the cache array with the received command, set a status bit associated with a cache entry to be valid.

8. The apparatus of claim 7, wherein the cache command controller is further configured to:

upon completion of executing the received command, remove the received command from the cache array by setting a status bit associated with a cache entry of the received command to be invalid.

9. The apparatus of claim 1, wherein the cache command controller is further configured to:

loop through entries in the cache array, examine entries of the cache array in a wrapped around manner;

detect data range of the received command with respect to commands from the entries of the cache array;

identify related command pairs based on the data range of the received command with respect to the commands; and store the related command pairs in an output queue.

10. The apparatus of claim 9, wherein the cache command controller is further configured to:

scan the cache array to record empty entries;

determine a skip count based on a number of empty entries to be skipped; and skip consecutive empty entries by the cache validation checker based on the skip count.

11. The apparatus of claim 9, wherein an entry in the related command pairs output queue comprises:

an index of the received command;

an index of an existing command; and a status of relationships between the received command and the existing command.

12. The apparatus of claim 9, wherein the cache command controller is further configured to:

resolve overlapping commands using time stamps and command identifiers from an event page array, wherein the event page array is correlated to the received command with a same index array;

re-order the overlapping commands using time stamps from the event page; and ignore duplicate commands based on indexes of the overlapping commands being the same.

13. A method of cache control in a parallel processing system, comprising:

generating, by an application engine in a plurality of application specific engines, a command;

receive, by a cache command controller, the command asynchronously from the application specific engine in the plurality of application specific engines;

updating, by the cache command controller, a cache array to include the received command; and validating, by the cache command controller, the updated cache array while maintaining parallel accessing of the cache array by the plurality of application specific engines.

14. The method of claim 13, wherein a command in the plurality of commands includes a command header descriptor, and wherein the command header descriptor comprises:

an index configured to indicate a location of the entry in the cache array;

a validity bit configured to indicate whether the entry is valid;

a length field configured to indicate a length of the entry; and a logical block address configured to indicate a starting address of the entry.

15. The method of claim 13, further comprising:

selecting, by a command arbitrator, the received command from the plurality of application specific engines for processing.

16. The method of claim 13, wherein the plurality of commands comprises at least one of:

one or more host commands received via a host interface; or one or more recycle commands, retrieved from a recycle queue, configured to identify a NAND block of a solid-state drive for recycle.

17. The method of claim 13, wherein updating the cache array to include the received command comprises:

searching the cache array to identify an empty entry to store the received command; and inserting the received command to the empty entry in the cache array.

18. The method of claim 17, wherein searching the cache array to identify the empty entry comprises:

scanning the cache array to record valid entries and full entries; and skipping valid entries and full entries during the search of the cache array.

19. The method of claim 13, further comprising:

in response to updating the cache array with the received command, activating a cache validation checker to validate the received command in the updated cache array; and upon updating the cache array with the received command, setting a status bit associated with a cache entry to be valid.

20. The method of claim 19, further comprising:

upon completion of executing the received command, removing the received command from the cache array by setting a status bit associated with a cache entry of the received command to be invalid.

21. The method of claim 19, wherein activating the cache validation checker to validate the received command in the updated cache array comprises:

looping through entries in the cache array, examining entries of the cache array in a wrapped around manner;

detecting data range of the received command with respect to commands from the entries of the cache array;

identifying related command pairs based on the data range of the received command with respect to the commands; and storing the related command pairs in an output queue.

22. The method of claim 21, wherein examining entries of the cache array further comprising:

scanning the cache array to record empty entries;

determining a skip count based on a number of empty entries to be skipped; and skipping consecutive empty entries by the cache validation checker based on the skip count.

23. The method of claim 21, wherein an entry in the related command pairs output queue comprises:

an index of the received command;

an index of an existing command; and a status of relationships between the received command and the existing command.

24. The method of claim 21, further comprising:

resolving overlapping commands using time stamps and command identifiers from an event page array, wherein the event page array is correlated to the received command with a same index array;

re-ordering the overlapping commands using time stamps from the event page; and ignoring duplicate commands based on indexes of the overlapping commands being the same.

* * * * *